June 23, 1931.  F. N. G. KRANICH  1,811,055
GRAIN TANK FOR HARVESTERS
Filed April 20, 1929   2 Sheets-Sheet 1

Inventor
Frank N. G. Kranich
By
Atty.

June 23, 1931. F. N. G. KRANICH 1,811,055
GRAIN TANK FOR HARVESTERS
Filed April 20, 1929 2 Sheets-Sheet 2

Inventor
Frank N. G. Kranich
By [signature]
Atty.

Patented June 23, 1931

1,811,055

UNITED STATES PATENT OFFICE

FRANK N. G. KRANICH, OF RACINE, WISCONSIN, ASSIGNOR TO INTERNATIONAL HARVESTER COMPANY, A CORPORATION OF NEW JERSEY

GRAIN TANK FOR HARVESTERS

Application filed April 20, 1929. Serial No. 356,654.

The invention is in a grain tank for harvester threshers, corn pickers, and the like.

These machines are usually provided with a grain tank which is carried above the main wheel of the machine and high enough so that a wagon may be run alongside and beneath the tank to receive its contents when discharged therefrom by gravity. Such elevated grain tanks have some inherent objections. For example, when loaded, they tend to make the machine carrying them top heavy. Further, it is impossible to run such machines into the usual shelter barn for storage in off seasons, because the entrance or roofs of such shelters do not provide sufficient height to clear the elevated grain tank.

Accordingly, it is the primary object of the invention to provide a grain tank for these machines, which will overcome the objections above noted, without in any way sacrificing the capacity or impairing the usefulness of these tanks.

Other objects will be apparent to those skilled in this art as the disclosure continues.

These objects are briefly achieved by lowering the grain tank materially and mounting the same for pivotal movement so that power driven connections may be caused to tilt the tank upwardly and outwardly from the normal loading position to discharge the contents thereof by gravity into a wagon standing alongside the tank.

In the accompanying drawings showing an illustrative embodiment of the invention:

Figure 1:
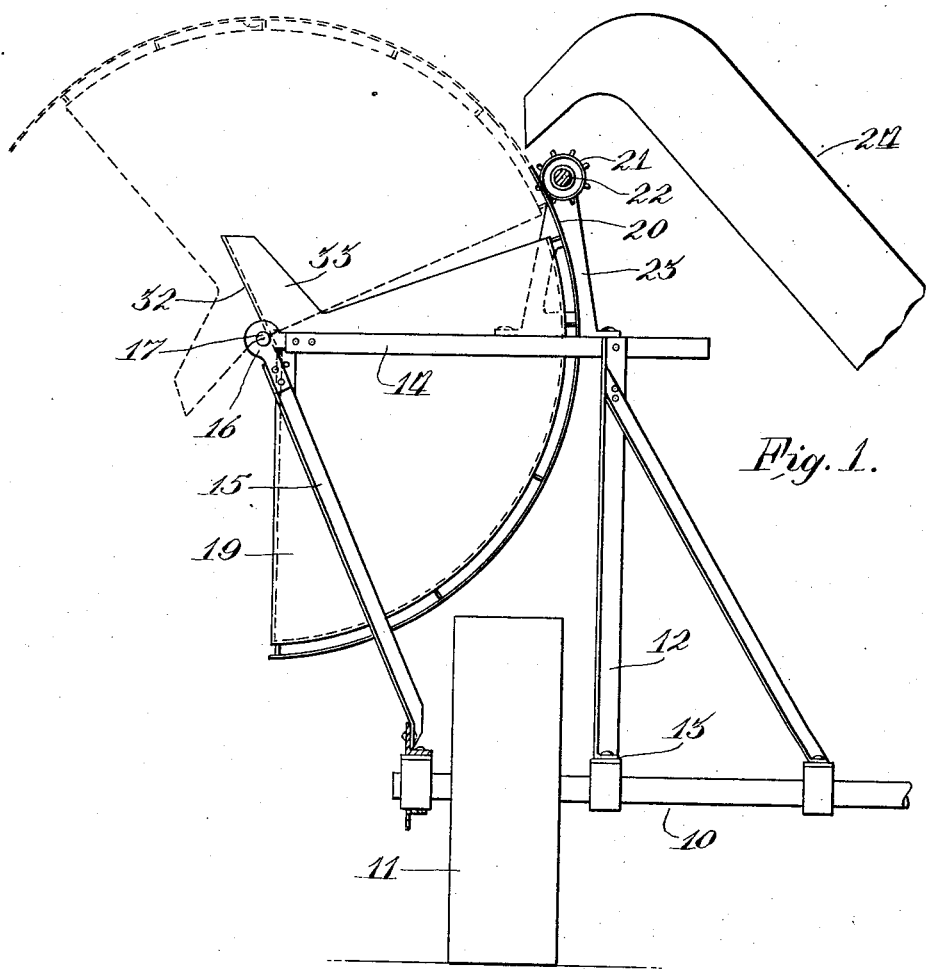
Figure 1 is a general rear elevational view of the tank mounted on a harvester thresher adjacent its main wheel.
Figure 3:
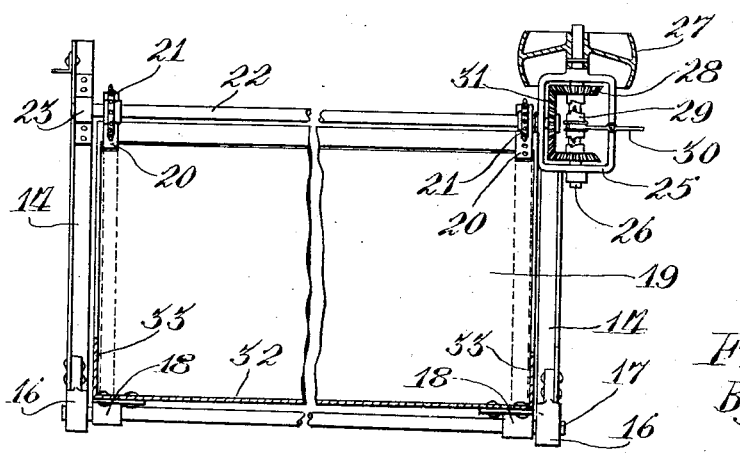
Figure 3 is a general top plan view of the tank per se, partly in section.
Figure 2:
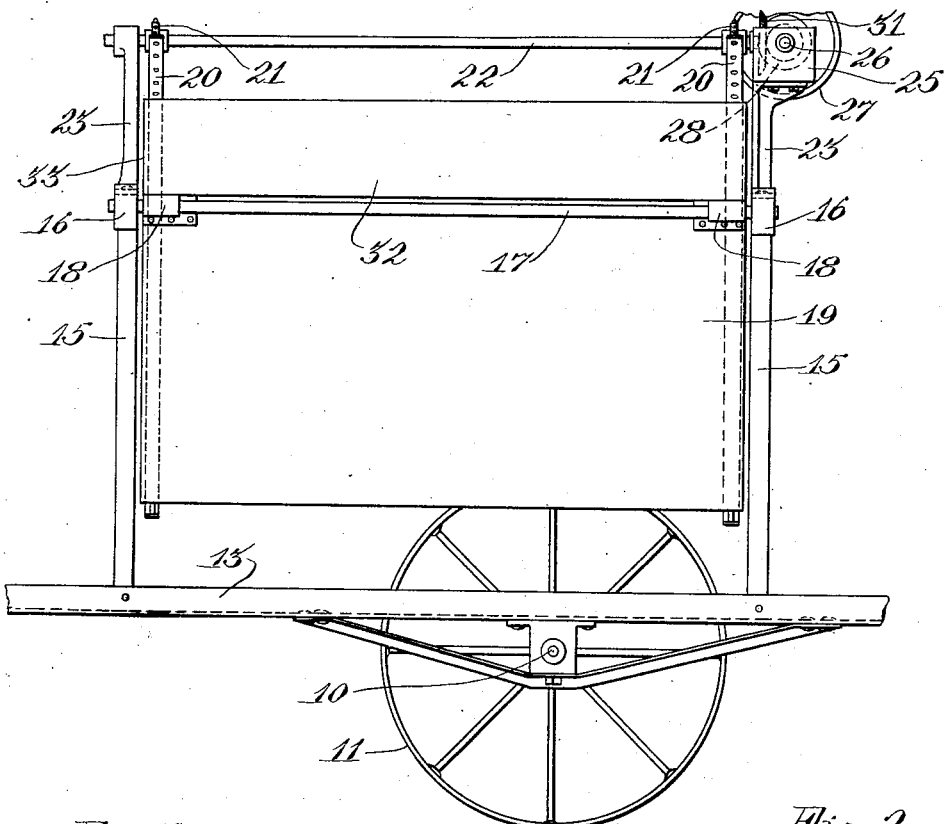
Figure 2 is a general side elevational view of the same structure.
Figure 4:
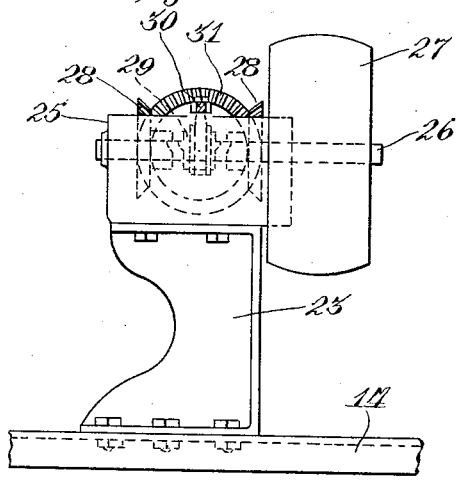
Figure 4 is a rear end view of a drive assembly for tilting the tank to unload the same.

To illustrate the improved tank, a harvester thresher has been shown, having the usual carrying axle 10, on which is journaled the main wheel 11. Uprights 12 are mounted on the main frame 13 adjacent the main wheel 11. These uprights carry laterally extending bars 14, which are braced by diagonal braces 15 in the manner shown. At the angle between the bars 14 and braces 15 are arranged brackets 16 in which is journaled a longitudinally extending shaft 17 disposed outwardly and above the outer face of the main wheel.

This shaft 17 carries rockingly or pivotally mounted front and rear blocks 18 to which is connected a tank or bin 19. The upper left hand edge of the tank, as seen in the drawings, is connected to the supporting and pivot shaft 17 which enables the major portion of the tank to be suspended below the shaft and side bars 14. The manner of this mounting results in a substantial lowering of the tank when compared with the mounting of standard tanks, making it possible to store the machine in conventional barns and lowering the weight of a full tank to minimize top heaviness. All of this is accomplished without lessening the standard size of such tanks.

The bottom of the tank is curved inwardly and upwardly, as shown, in an arc, and each end of the bottom and back wall into which it merges carries an arcuate rack bar 20. These bars 20 are in geared mesh with gears 21 carried on the front and rear ends of a longitudinal shaft 22 which is journaled for rotation in brackets 23 mounted on the bars 14. When the tank is in its normal down position for receiving a load, the gears 21 mesh with the upper end of the racks, as appears in Figure 1. The top side of the tank is open so that grain discharged from the usual elevator 24 may fall thereinto.

The gears 21 are driven in the following manner: The rear bracket 23 carries a housing 25 in which is journaled a stub shaft 26 carrying at one extended end a pulley 27, or other means, adapted to be driven preferably from some moving part of the elevator 24. Inside the housing 25, the shaft 26 carries two loose bevel gears 28 between which is a clutch part 29 splined to turn with the shaft and slidable by a hand lever 30 to clutch the part 29 with either gear 28.

The gears 28 are in mesh with a bevel gear 31 keyed to the shaft 22.

The tank carries at its upper outer edge a chute board 32 provided with ends 33, which may be a continuation of the end walls of the tank.

In operation, the harvester upon which the tank is carried moves through the field with the elevator 24 discharging grain into the tank 19. When the tank is full, the harvester is stopped and a wagon is moved alongside the tank to receive the contents thereof. The tank is dumped by moving the clutch part 29 from its neutral position into mesh with the proper gear 28 to cause the shaft 22 and gears 21 to be rotated. This moves the racks 20 and the tank therewith upwardly to the dotted line position shown in Figure 1, which causes the grain to be discharged over the chute 32, by gravity, into the wagon. After the tank has been discharged, obviously, the same can be returned to normal charging position upon a reverse movement of the clutch lever 30 to drive the drive parts reversely.

From this disclosure, it can now be appreciated that an improved grain tank has been provided for harvesters, which enables lowering the location of the tank. Further, the elevator 24 may also be reduced in its length proportionately. Another advantage of this construction results from the fact that no doors are provided which must be opened and closed. Such doors or gates, of course, add to costs and further stick in practice, which makes it difficult to operate them. Also, by tilting the whole tank, the dumping takes less time than when using doors.

It is the intention to cover all such changes and variations of the form of the invention herein described as do not in material respects depart from the spirit and scope of the invention as is indicated by the subject-matter defined in the appended claims.

What is claimed is:

1. For a harvester having a framework, a tank having an open top, means pivotally connecting an upper edge of the tank to a shaft on said framework, and power actuated means for tilting the tank to dump the same.

2. For a harvester having a framework, a tank tiltably carried thereon, said tank having an open top and an arcuately curved bottom merging into a back wall, and means for tilting the tank to discharge its contents.

3. For a harvester having a framework, a tank tiltably carried thereon, said tank having an open top and an arcuately curved continuous bottom and back wall, a rack on the said wall, a gear meshing with the rack, and means for driving the gear to tilt the tank for dumping the same.

In testimony whereof I affix my signature.

FRANK N. G. KRANICH.